United States Patent
Zapata et al.

(10) Patent No.: US 9,424,270 B1
(45) Date of Patent: Aug. 23, 2016

(54) SYSTEM AND METHOD FOR MANAGING MEDIA FILES

(75) Inventors: Charles B. Zapata, Redmond, WA (US); Daniel J. Shapiro, Seattle, WA (US); Michael Arcuri, Seattle, WA (US)

(73) Assignee: Photobucket Corporation, Denver, CO (US)

( * ) Notice: Subject to any disclaimer, the term of this patent is extended or adjusted under 35 U.S.C. 154(b) by 446 days.

(21) Appl. No.: 12/785,061

(22) Filed: May 21, 2010

(51) Int. Cl.
*G06F 17/30* (2006.01)

(52) U.S. Cl.
CPC ... *G06F 17/30174* (2013.01); *G06F 17/30176* (2013.01)

(58) Field of Classification Search
None
See application file for complete search history.

(56) References Cited

U.S. PATENT DOCUMENTS

| | | | |
|---|---|---|---|
| 6,167,469 A | 12/2000 | Safai et al. | |
| 6,353,848 B1 | 3/2002 | Morris | |
| 6,442,573 B1 | 8/2002 | Schiller et al. | |
| 6,628,965 B1 | 9/2003 | LaRosa et al. | |
| 6,750,890 B1 | 6/2004 | Sugimoto | |
| 6,763,226 B1 | 7/2004 | McZeal, Jr. | |
| 6,914,695 B2 | 7/2005 | Walters et al. | |
| 7,050,836 B2 | 5/2006 | Paakkonen | |
| 7,068,643 B1 | 6/2006 | Hammond | |
| 7,284,040 B2 | 10/2007 | Kobayashi et al. | |
| 7,363,330 B1 * | 4/2008 | Ellman et al. | 707/620 |
| 7,509,376 B2 | 3/2009 | Mousseau et al. | |
| 7,694,128 B2 | 4/2010 | Judge et al. | |
| 7,724,281 B2 | 5/2010 | Vale et al. | |

| | | |
|---|---|---|
| 2001/0010543 A1 | 8/2001 | Ward et al. |
| 2002/0102966 A1 | 8/2002 | Lev et al. |
| 2002/0113879 A1 | 8/2002 | Battle et al. |

(Continued)

FOREIGN PATENT DOCUMENTS

| | | |
|---|---|---|
| WO | WO 02056181 A2 * | 7/2002 |
| WO | WO-2007/038766 | 4/2007 |

OTHER PUBLICATIONS

International Search Report and Written Opinion of the International Searching Authority, issued for PCT/US2008/77439, Dec. 11, 2008, 10 pages.

(Continued)

*Primary Examiner* — Tyler Torgrimson
(74) *Attorney, Agent, or Firm* — Norton Rose Fulbright US LLP

(57) ABSTRACT

Systems and methods are presented which allow a user's device to accept media from a variety of sources, process those media items based on their characteristics, and deliver the captured media to a pre-established variety of diverse locations with minimal or no user interaction. These systems and methods can also make media items available to a plurality of internet web sites without actually creating and delivering copies of files. In one embodiment, the diverse locations can each have individual delivery protocols (for example, login and formats) and when a number of media are available at the user's device for delivery to storage locations the media can be delivered to pre-established locations with a single user command without regard to the individual location delivery requirements. In another embodiment, processing, delivery, and access to new media items is handled automatically based on pre-established criteria and analysis of the data and metadata of the media items themselves. While unobtrusive user feedback is displayed during media processing, no user attention or intervention is required as long as no changes to the default settings are desired.

16 Claims, 8 Drawing Sheets

(56) References Cited

U.S. PATENT DOCUMENTS

| | | |
|---|---|---|
| 2002/0167595 A1 | 11/2002 | Patel et al. |
| 2002/0174206 A1 | 11/2002 | Moyer et al. |
| 2003/0046447 A1 | 3/2003 | Kouperchliak et al. |
| 2003/0081739 A1 | 5/2003 | Hikishima |
| 2003/0146977 A1 | 8/2003 | Vale et al. |
| 2003/0172127 A1 | 9/2003 | Northrup et al. |
| 2003/0229667 A1 | 12/2003 | Pedersen et al. |
| 2004/0070671 A1 | 4/2004 | Bengtsson |
| 2004/0098569 A1 | 5/2004 | Smith et al. |
| 2004/0107356 A1* | 6/2004 | Shamoon et al. ............ 713/193 |
| 2004/0109063 A1 | 6/2004 | Kusaka et al. |
| 2004/0171371 A1 | 9/2004 | Paul |
| 2004/0199611 A1 | 10/2004 | Bernhard et al. |
| 2004/0199614 A1 | 10/2004 | Shenfield et al. |
| 2004/0230670 A1 | 11/2004 | Schmidt-Karaca et al. |
| 2004/0268340 A1 | 12/2004 | Steeb et al. |
| 2005/0036034 A1 | 2/2005 | Rea et al. |
| 2005/0082370 A1 | 4/2005 | Frantz et al. |
| 2005/0134691 A1 | 6/2005 | Cox |
| 2005/0149979 A1 | 7/2005 | Creamer et al. |
| 2006/0004914 A1* | 1/2006 | Kelly et al. ................... 709/219 |
| 2006/0133642 A1* | 6/2006 | Crenshaw ..................... 382/100 |
| 2006/0206592 A1 | 9/2006 | Fujii et al. |
| 2007/0006150 A9 | 1/2007 | Walmsley |
| 2007/0016659 A1 | 1/2007 | Peck et al. |
| 2007/0061487 A1 | 3/2007 | Moore et al. |
| 2007/0220575 A1* | 9/2007 | Cooper et al. ................ 725/118 |
| 2008/0279562 A1 | 11/2008 | Naoe et al. |
| 2008/0301231 A1 | 12/2008 | Mehta et al. |
| 2009/0031300 A1 | 1/2009 | Vau et al. |
| 2009/0037515 A1* | 2/2009 | Zapata et al. ................. 709/202 |
| 2009/0100166 A1 | 4/2009 | DeAnna et al. |
| 2009/0111488 A1 | 4/2009 | Vau et al. |
| 2009/0187756 A1 | 7/2009 | Nollet et al. |
| 2009/0231441 A1 | 9/2009 | Walker et al. |
| 2009/0328169 A1* | 12/2009 | Hutchison et al. ............... 726/7 |
| 2010/0182193 A1 | 7/2010 | Lin et al. |
| 2010/0184451 A1* | 7/2010 | Wang et al. ............... 455/456.1 |
| 2010/0241597 A1* | 9/2010 | Chen et al. .................... 706/12 |
| 2011/0047182 A1* | 2/2011 | Shepherd et al. ............ 707/780 |
| 2011/0218995 A1* | 9/2011 | Ayars et al. .................. 707/737 |

OTHER PUBLICATIONS

International Search Report and Written Opinion of the International Searching Authority, issued for PCT/US2006/038207, Jul. 31, 2008, 14 pages.

* cited by examiner

SYSTEM AND METHOD FOR MANAGING MEDIA FILES

CROSS-REFERENCE TO RELATED APPLICATIONS

This application incorporates by reference the following U.S. filed applications: U.S. patent application Ser. No. 11/877,845 filed Oct. 24, 2007 entitled "SYSTEM AND METHOD FOR AUTOMATIC TRANSFER OF DATA FROM ONE DEVICE TO ANOTHER"; U.S. patent application Ser. No. 11/540,497 filed Sep. 28, 2006 entitled "METHOD AND SYSTEM FOR ESTABLISHING A USER-FRIENDLY DATA TRANSFER SERVICE APPLICATION EXECUTING WITHIN A HETEROGENEOUS DISTRIBUTED SERVICE APPLICATION EXECUTION ENVIRONMENT"; U.S. patent application Ser. No. 12/111,492 filed Apr. 29, 2008, entitled "SYSTEM AND METHOD FOR CONTROLLING INTER-DEVICE MEDIA EXCHANGES"; U.S. patent application Ser. No. 11/732,508 filed Apr. 2, 2007 entitled "METHOD AND SYSTEM FOR PHONE-NUMBER DISCOVERY AND PHONE-NUMBER AUTHENTICATION FOR MOBILE COMMUNICATIONS DEVICES"; and U.S. patent application Ser. No. 12/569,313 filed Sep. 29, 2009, entitled "SYSTEM AND METHOD FOR ALLOWING A USER TO OPT FOR AUTOMATIC OR SELECTIVELY SENDING OF MEDIA", all of the above being co-pending and commonly owned.

TECHNICAL FIELD

This disclosure relates to management of media files and more particularly to systems and methods for managing, processing, copying, and/or exposing media among a plurality of destinations in a highly efficient and/or automatic manner.

BACKGROUND OF THE INVENTION

The above-identified related applications are directed to various concepts in which media, such as photographs, text, video, etc. created on one device are made available to or sent as copies to pre-selected devices, programs, internet services, and/or accounts. In certain embodiments, the photos are captured via a plurality of methods, for example, digital cameras, USB video cameras, scanners, mobile communicating devices (cell phone, etc.), and web browsers, and presented to a home PC as new files created on a fixed disk drive, or via portable media such as an SD card or USB thumb drive. In one embodiment, the invention residing on the home PC automatically detects new photos and videos and automatically processes, makes available, or copies each media item to a particular set of destinations as pre-established by the user. The destinations could be, for example, email addresses, folders on a home computer, third party software programs on the PC which accept media items as input, and third party online services requiring user credentials, such as Photobucket, Flicker, MySpace, Facebook, etc.

Media can be obtained by a device in many ways. The media can arrive as an attachment to, or contained in, an email, or in a text message, or it can be downloaded from a video camera, or from a web site, a social network, or the like. Thus, a user may receive media of various types from various sources using various delivery mechanisms. Some of the delivery mechanisms operate such that the user may not even be aware that media has arrived. This then presents a problem for the user to keep track of the media movement such that it is stored where it should be stored and delivered to whomever or wherever it should be delivered, and accessible in the contexts that it should be accessible in. It thus follows that the more active a user is with respect to incoming media the more difficult it is to keep the media properly organized.

An example of this difficulty is when a user receives media, such as photographs, from a friend or from a media memory, and the user desires to simply store those photographs on his/her home PC and share them with a few friends and colleagues. The typical procedure for this task is to insert the memory card into a card reader connected to the PC, choose a program to launch (such as the Windows Scanner and Camera Wizard) to aid in transferring the media, name the group of photos found, choose a destination folder on the hard drive, wait while each media file is copied in turn, and then finally choose whether or not to delete the original copies of the media files from the card. This is then followed by the user opening up the new folder containing the copied images using a program to view each photo in turn, and rotating one at a time any photos which are oriented incorrectly. Then the user launches a browser, navigates to an online service such as Photobucket or Facebook, enters their user name and password, navigates to the photo area within the online service, and creates a new album for the new photos. Finally, an uploader program is run from the web site, and the media is all uploaded while the user again waits for completion. The last step is to notify friends and family of the new photos, often by sending an email message to the desired people containing a link to the website which now stores the new photos. For this type of task, it is not at all uncommon to spend a full hour or more on the process, and based on the time and energy required, users tend to view the transfer and sharing of their photos as an unpleasant chore and postpone it as long as possible.

In some situations the user may desire to do more than simply store the media at a single location. For example, photos incoming to the user perhaps from a camera memory, or from a social network connection, may need to be stored on the user's PC as well as sent to a family member and perhaps concurrently to a web site (Facebook, Flicker, MySpace, etc.) for storage or further display. A more advanced internet user who has a group of friends on MySpace, a different group on Facebook, some good business colleagues on LinkedIn, and grandparents who are reluctant to create online accounts at various websites, may have to go through the full sequence explained previously and then repeat some or all of the upload and notification tasks several times before they are finished. Currently, there is no system that allows a user to receive media and distribute the received media concurrently to a number of diverse locations without some intervention on the part of the user for each destination and on a media by media basis.

Compounding the problem is the technical limitation that various locations have particular requirements for the media content itself and perhaps particular requirements for the transportation protocol. On top of that, many locations, such as web sites, have their own specific login and identification requirements. Even remembering multiple passwords for multiple sites is difficult for users. Thus, several problems exist when a user attempts to send media to multiple locations, and there's no good way to easily, efficiently, or simultaneously allow access to media or copy media in full to multiple locations with different requirements.

Another limitation for active internet users is one of access to media from within various digital contexts. Over a period of years, it's very common for users to switch between primary online photo and video album web sites and change their primary social networks. This results in a patchwork situation in which all the user's media items created over a period of several years have become partially available across each of multiple online web sites, and no single site or digital tool serves as a full repository of viewing, editing, managing, and sharing these media items. For example, when the user is viewing their photos in an album at www.kodakgallery.com, they may be looking to order prints or create gift items, such as calendars, for friends or family members. But it's often the case that the user will have only some of the media they're interested available on the Kodak site, and the user must then go through a process of searching other repositories, and downloading and/or uploading media files they're interested in to the Kodak site to finish construction of the gifts or get the full set of prints.

BRIEF SUMMARY OF THE INVENTION

Systems and methods are presented which allow a user's device to accept media from a variety of sources, process those media items based on their characteristics, and deliver the captured media to a pre-established variety of diverse locations with minimal or no user interaction. These systems and methods can also make media items available to a plurality of internet web sites without actually creating and delivering copies of files. In one embodiment, the diverse locations can each have individual delivery protocols (for example, login and formats) and when a number of media are available at the user's device for delivery to storage locations the media can be delivered to pre-established locations with a single user command without regard to the individual location delivery requirements. In another embodiment, processing, delivery, and access to new media items is handled automatically based on pre-established criteria and analysis of the data and metadata of the media items themselves. While unobtrusive user feedback is displayed during media processing, no user attention or intervention is required as long as no changes to the default settings are desired.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
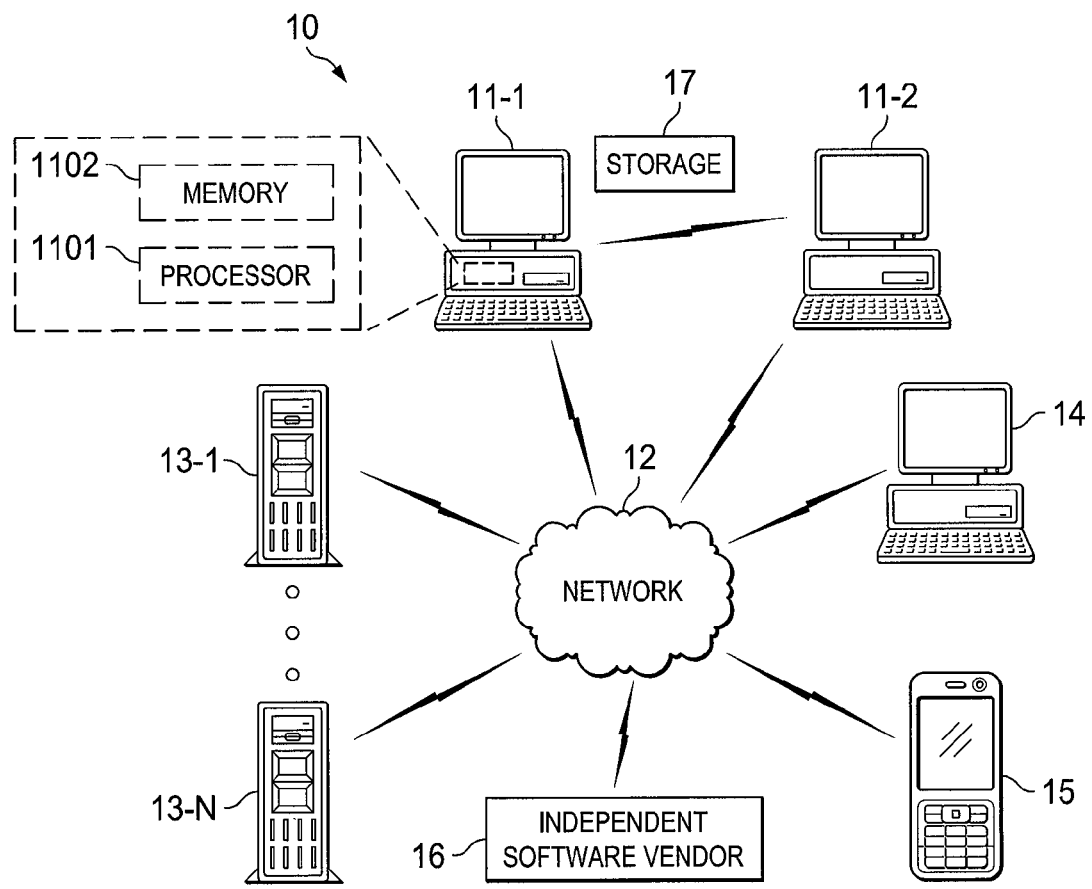
FIG. 1 illustrates one embodiment of the connections between components in the system.

FIG. 1 illustrates one embodiment 10 of a system in which the concepts of the invention will work. In the embodiment shown, PC 11-1 is connected to network 12 by a connection that can be, for example, wireless or wireline or a combination thereof. PC 11-1 is also connected via a local area network (LAN) to PC 11-2. PCs 11-1 and 11-2, as well as the various other system components, can be controlled by a local memory and processor, such as processor 1101 and memory 1102, as well as other control circuitry, not shown. In one embodiment, application software runs on a tangible medium which controls the processor to control the operation of the system and controls communications with various destination locations, such as servers 13-1 to 13-N, other PCs, such as PC 14, mobile devices, such as cell phone 15 and independent software vendors (ISV), such as vendor 16 as well as any number of other locations.

As will be discussed, a user device, such as PC 11-1, may have delivered to it media, such as photos, video, etc. from one or more sources. These sources can be external to PC 11-1, such as from storage card 17 (which can be, for example, a camera XD card) or the media could arrive at PC 11-1 as part of an e-mail attachment, or as part of a download from a remote site or from any number of other sources and locations. When the media arrives, (or otherwise becomes available) a user at device 11-1 will want the media adjusted for pleasant viewing saved within device 11-1 or saved at one or more locations remote from PC 11-1 so the content can be subsequently viewed, edited, shared or printed.

Figure 2:
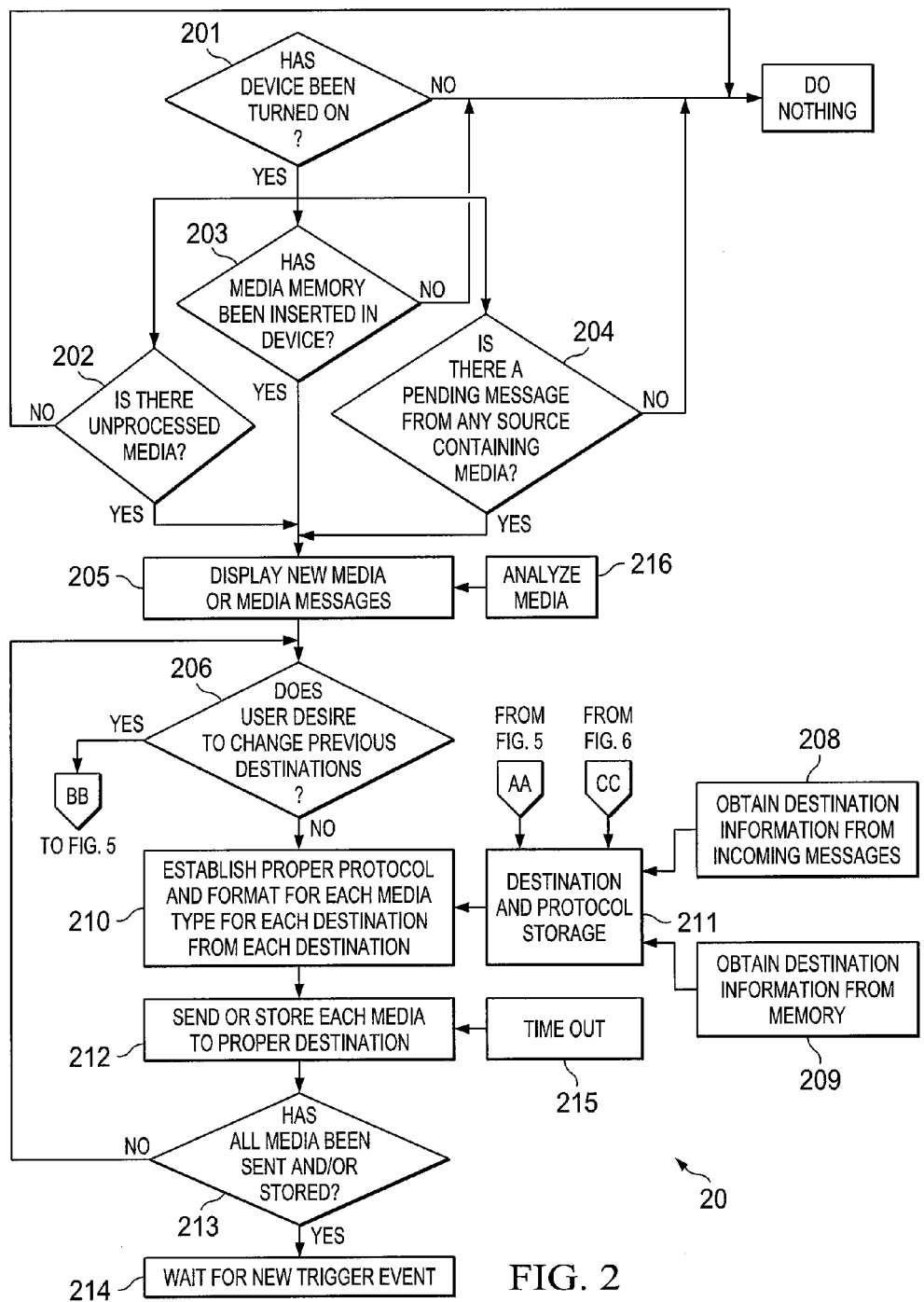
FIG. 2 shows one embodiment of code controlled processor operations to facilitate the concepts of the invention.

FIG. 2 shows one embodiment 20 for controlling the operations described herein such that process 201 detects that the device is in the "on" state. Processes 202, 203 and 204 (as well as any other process that detects media from any source, or otherwise available for storage or processing) causes process 205 to display the new media, or to display a message pertaining to the new media. This display could, for example, be thumbnail images of the various media currently available. In the situation of a media message, the message tells the user what is available, for example, a statement saying, "Thirty-one new photos have been received. These photos have been received from camera card XD-home camera." Note that the message can be displayed on the screen or verbally delivered to the user and it can contain more or less information, as desired. In some situations the message will provide information pertaining to the content of the video.

The content information can come from the source from which the media was received, metadata contained with the received media (e.g. file names, date and time information, location information, etc.) or can come from an analysis of the media itself, such as provided by analyze media process 216 which can be, for example, picture recognition algorithms or the content information can be derived from the source of the media or from its location. For example, pictures taken from a zoo can be designated as "animal" pictures by analyzing the image, or by metadata added to the file or simply by the system knowing the zoo's physical location and knowing that the picture was taken at the physical location of the zoo. As will be discussed, the user at the receiving PC may have already designated that pictures of animals are to be stored in location XYZ and also posted on Facebook and sent to grandchildren. Likewise, a user could set up the system such that media captured at any location away from a home location (or at a specific location) is stored in a "travel" file on the local PC and sent to one or more travel designated remote locations while all other image media is stored within a different file on the PC. This pre-assignment of where media is to be stored (which includes locations where it is to be sent) is called the delivery protocol herein and includes not only the location to where the media is to be sent, but also the communication link protocol and credentials for authentication and/or authorization, as well as, the specific storage protocol of the location. The storage protocol can include such factors as pixel size, media content, media type, posting limits, etc.

Figure 3:
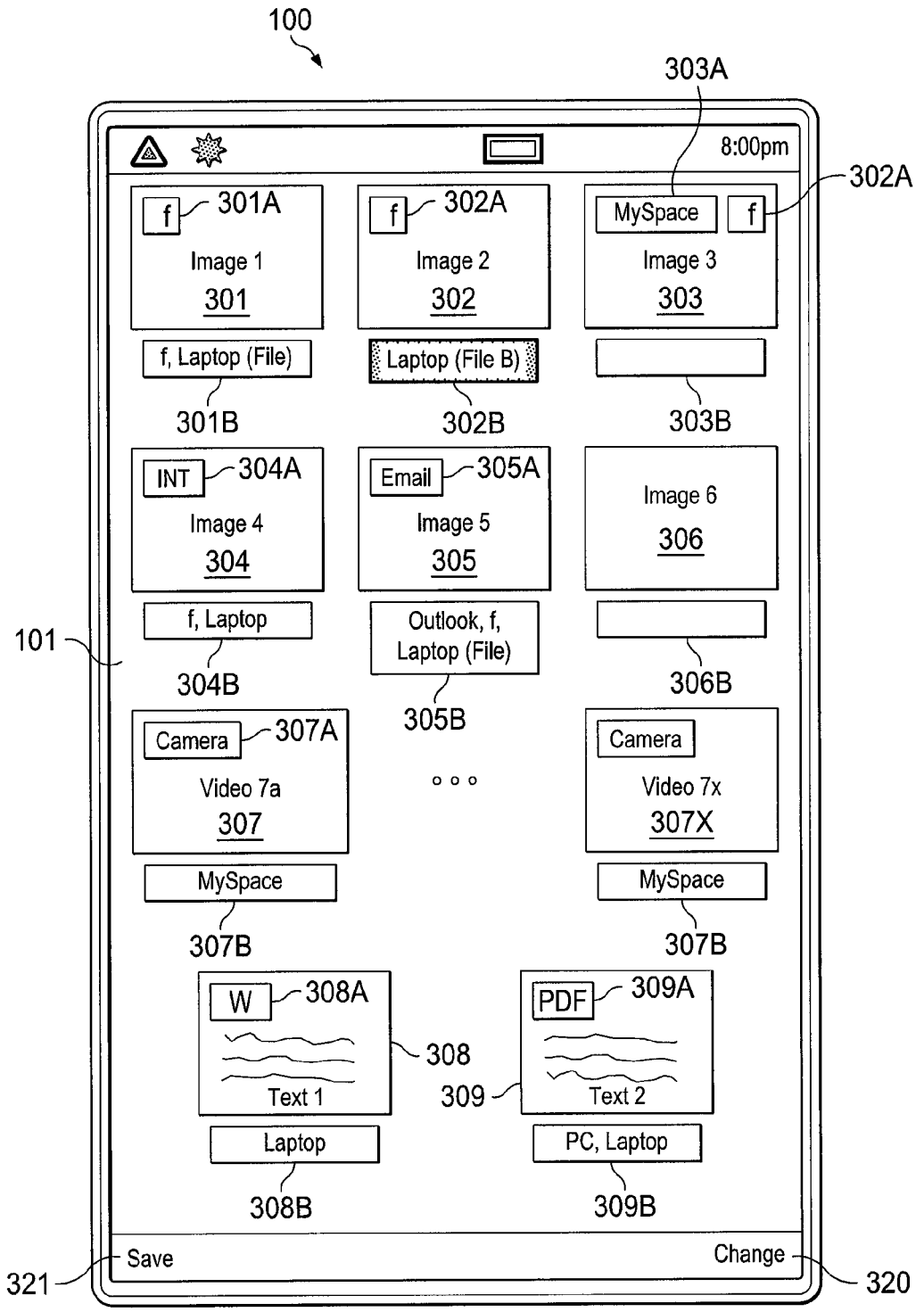
FIGS. 3 and 4 show embodiments of media displays controlled by a user.

Process 206 determines if the user wishes the system to process the received media according to already established protocols for the category of media being considered. For example, the newly presented media can be displayed for the user such as is shown in FIG. 3 which is a user friendly UI showing that the device has found (or captured) media and displaying that media to the user. This display could be automatic or it could be as a result of the user responding to a prompt to see the new media. Each piece of media, whether a photo, such as shown by image 1, 301, or by video 307A-307X, has associated therewith an indicator, such as indicator 301B for image 301, of the default distribution locations that pertain to that piece of media. If the user wants the displayed media to go according to the default distribution then the user, in one embodiment, need only choose OK button 321 and the media will be distributed according to the default settings.

As will be discussed, the newly found media is then processed locally based on the user's preferences as listed in media process 50 working in conjunction with process 210 and 211 (for example red eye corrected, rotated to be upright, and image processed to have good brightness, contrast, and color saturation), and made accessible to and/or actually uploaded to the proper default destinations with minimum involvement by the user. Note that the system could be enabled such that the default settings are used without any action on the part of the user unless the user takes a counter action within a period of time.

If the user signals his/her desire to change one or more of the default settings then the user, for example by enabling the CHANGE button 320, signals such an intention. Note that any number of methods can be used to signal a change, including a voice command, a touch of the media, etc. When a change in default delivery is desired process 206, working in conjunction with process 50, FIG. 5 (which will be discussed in more detail hereinafter) is called upon to process the user desired changes.

When the proper destinations are inputted (whether permanent or temporary) then process 211 (FIG. 2), in cooperation with process 210, determines the proper destination(s) (for example, via process 209) and causes each media to be formatted properly for each desired location for that media piece (e.g. by transcoding, resizing, etc.). This formatting includes both the formatting for each site and the formatting (if any) for the data communication (including the proper routing information) to the respective sites. The protocol for each location, such as the Facebook or Twitter formats, can be stored locally or remotely or a combination of each. The login, password and other protocols can reside in a database on the device, or, if desired, can be downloaded to the device from time to time.

Process 212 then sends the media to the proper destination(s) as established by the user taking into account the underlying protocol for each media type and for each media destination. As part of the delivery process a confirmation email or other notification (e.g. on-screen notification) can be sent to one or more locations confirming the action taken, all controlled by process 212. When all the media has been distributed to the proper location(s), processes 213 and 214 cause the system to wait for a new trigger event, i.e., the display of new media for the user or the user's device to process for storage (including delivery to an external location). The trigger event can be new media arriving at the device, or could be the passage of time or any other trigger the user decides upon.

An additional option handled by process 212 is maintaining a set of access permissions to the user's third party destinations, programs, and web sites. For any or all media items, they may be marked as "available" for certain third party web sites regardless of whether the media is physically sent or copied to the remote location. In this manner, a user could simply say (for example), that all local media is available to use from www.snapfish.com, and when the user is visiting and logged into that website, he/she will have all his/her media available for printing, editing, sharing, and gift creation. These remote services, such as Snapfish, can then simply include code in their pages to load and request access to user media (e.g. and Active X control, Java program, etc.). In operation, the Snapfish site can send a message to the system and the message will be received, in one embodiment, via process 208. depending upon the application, the desired function could then occur in system 20 with the results being sent to Snapfish or the function could be performed at the Snapfish site based on code sent from the management system. Thus, for any Snapfish users that are also users of the media management system described herein, a much more complete set of their media is now available for actions that can be performed at www.snapfish.com.

Figure 8:
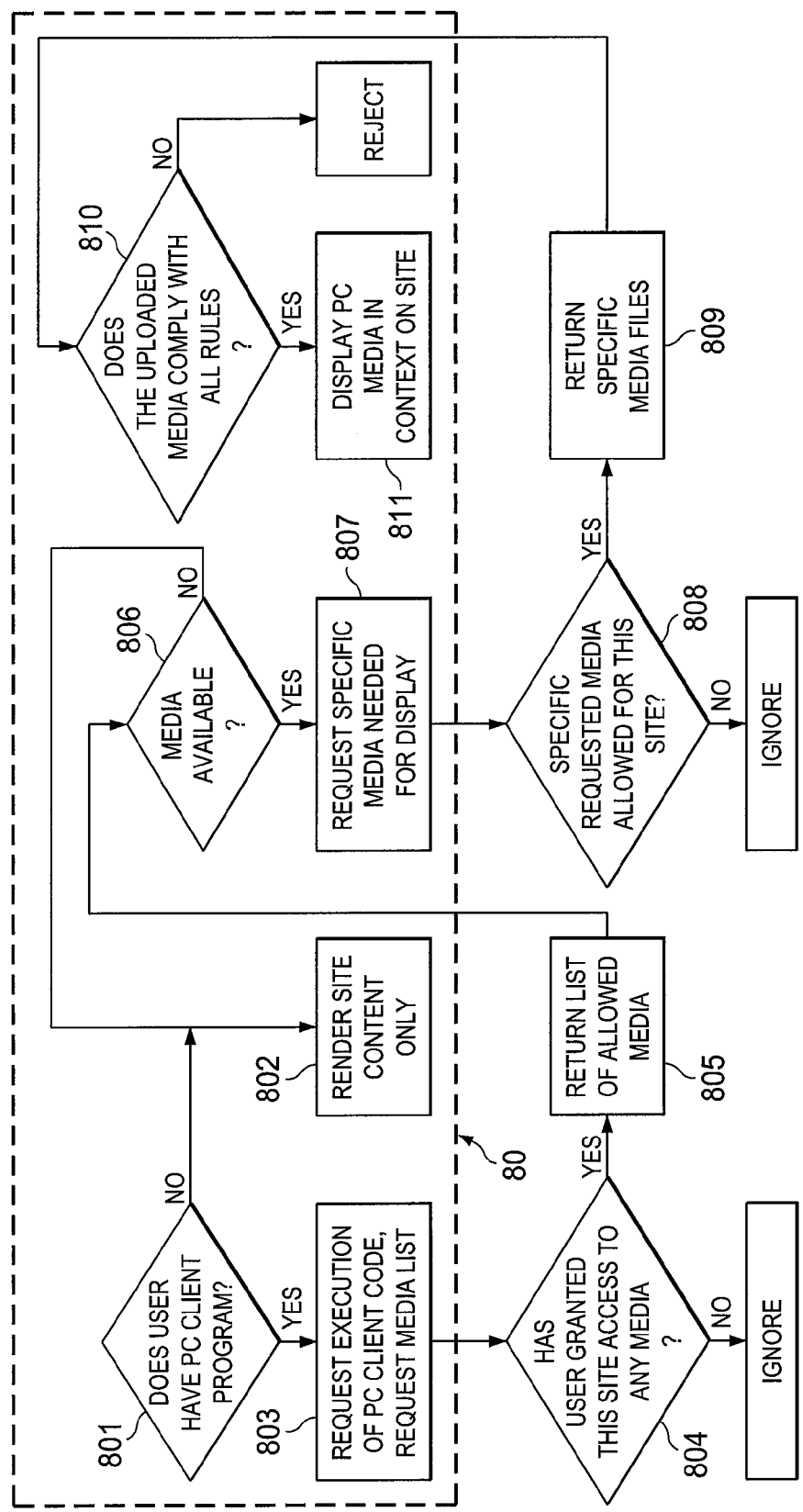
FIG. 8 shows one embodiment of a method for a web-based media service to request and access remote media items under management by the user's media management service.

FIG. 8 details an embodiment, 80, of the integration between a media-centric web property and the user's media management service using a PC. Process 801, running on a web site or third party program, determines if a particular user has a proper program for managing media content. If not, then the only the content already on the site (or third party) will be processed under control of process 802. If yes, then process 803 requests that the particular user's device (such as a PC) enable the application that is available for processing the media. Also, a request for uploading to any available media is made.

Process 804, at the user's device determines if the web site has permission to access this particular device belonging to this particular user. If so, then in process 805 this device returns a list of all media available for uploading and/or processing. If the media is uploaded then process 806 goes through the media list and requests from the user's device any specific media allowed to be uploaded to this site, process 807. This is important because each web site is different in what it will accept and the format that it will accept it in. As one specific example, assume that site 830 only accepts media of a particular subject, such as homes. The user may have captured media pertaining to homes, animals and random other scenes. In such a situation, site 830 will only request uploading media content pertaining to homes (buildings) and will not request media pertaining to the family's pet, or uncle George. Any type of restriction can be applied, such as subject matter, location, quality, time, etc. Thus, site 830 may not allow nude media to be uploaded and thus will not request such media. The determination of which media to request can be by observing the media itself or from meta data (or other information) associated with the media. In some case, the site may request certain media be uploaded so that the site itself, via optional process 810 can examine the media before acceptance.

It can be a two-way proposition as to which sites the media will be uploaded to. Thus, process 808 will determine whether or not the user has authorized (or will authorize on a case by case basis) any selected media. For example, the user may only allow media pertaining to children to be uploaded to Photobucket but not to any other website. If that is the case, then process 808 will ignore requests from other sites or third parties to upload media pertaining to a child, while media pertaining to the user, or the user's pets will be allowed to be supplied to the site. Process 809 makes the requested media available to site 830, if requested by site 830 and if approved either automatically by process 808, or manually by the user in conjunction with process 808.

Process 811 then makes the uploaded media available on site 830 using whatever rules and media format requirements that are necessary for compliance with the site requirements, all without user involvement.

Note that process 801 can be started at random times or at set times without prior user prompting and/or process 801 can begin upon a user prompt, such as by a start message from the user or a login. The user prompt can be manual but preferably would be automatic.

Figure 7:
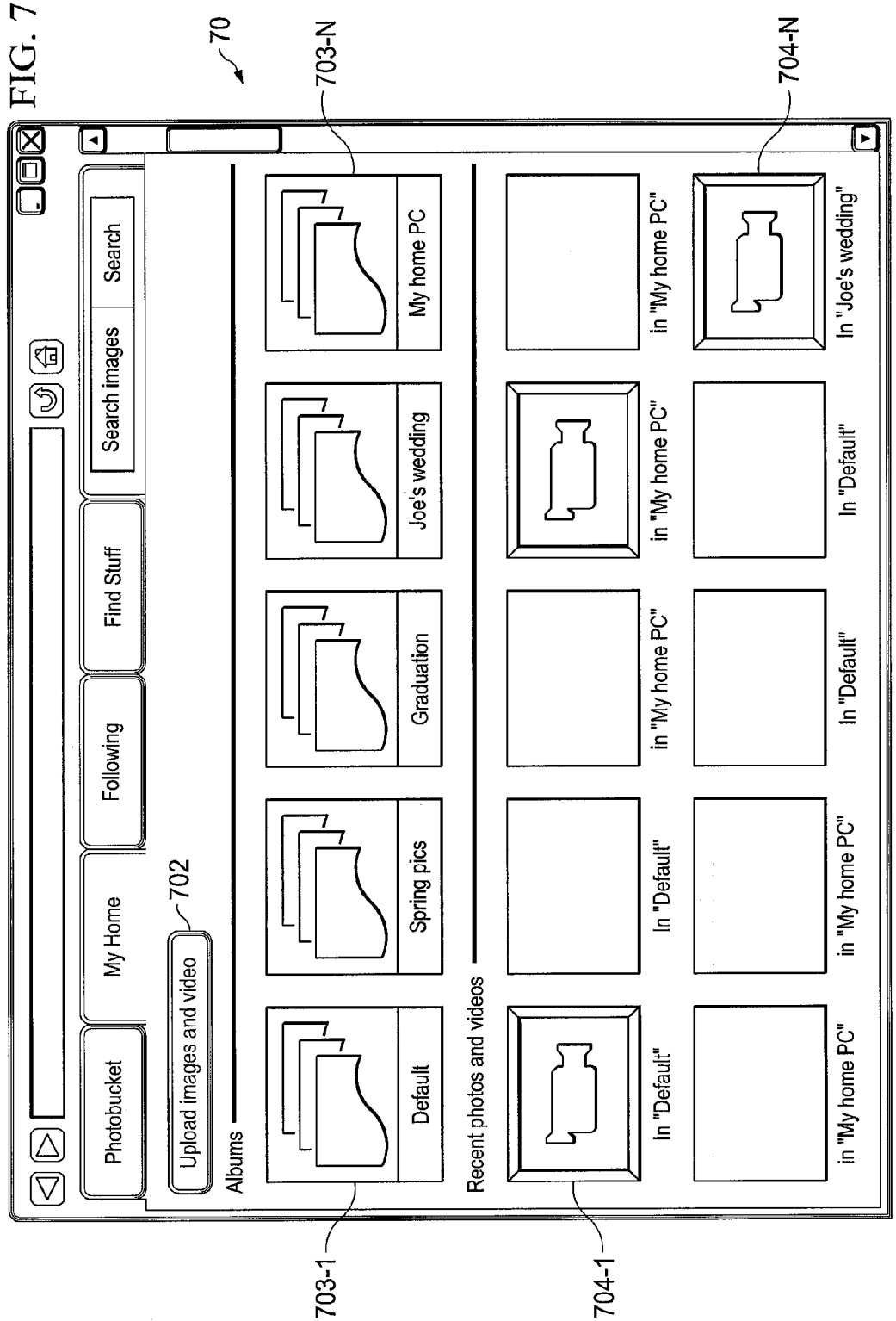
FIG. 7 shows on embodiment of a user interface for a web-based media album service displaying both the user's locally stored content and remotely accessible content for use in the web service.

FIG. 7 details one embodiment 70 of a user interface (shown on Photobucket.com, which includes both media items local to the Photobucket data storage system and remote media belonging to the user for which Photobucket has been granted access. In some cases, the bulk of this remote media would be made available from the user's home PC hard disk drive. From the Photobucket site the user can enable button 702 to upload media from a connected device, such as from the user's home PC. This uploading will occur, in one embodiment, as shown in FIG. 8, and will go into one or more albums, such as albums 703-1 to 703-N. Recent photos and videos can be shown to be stored at a particular location, such as 704-1 to 704-N based upon the interaction a particular site has with the user's various devices. One aspect of the concepts discussed herein is that the site could, if desired, show a user where various different media files are stored even if they are not on the site itself. For example, the user may have several media capture devices and some media storage devices. Then when process 80 (FIG. 8) runs, site 830 could access all of the devices from time to time and even if the media is for one reason or another not uploaded, site 830 could maintain a log of the different files on the different devices, and even on devices belonging to other users (assuming proper permissions are granted), so that the user, by accessing site 830 can find any desired media regardless of where it is stored.

Figure 4:
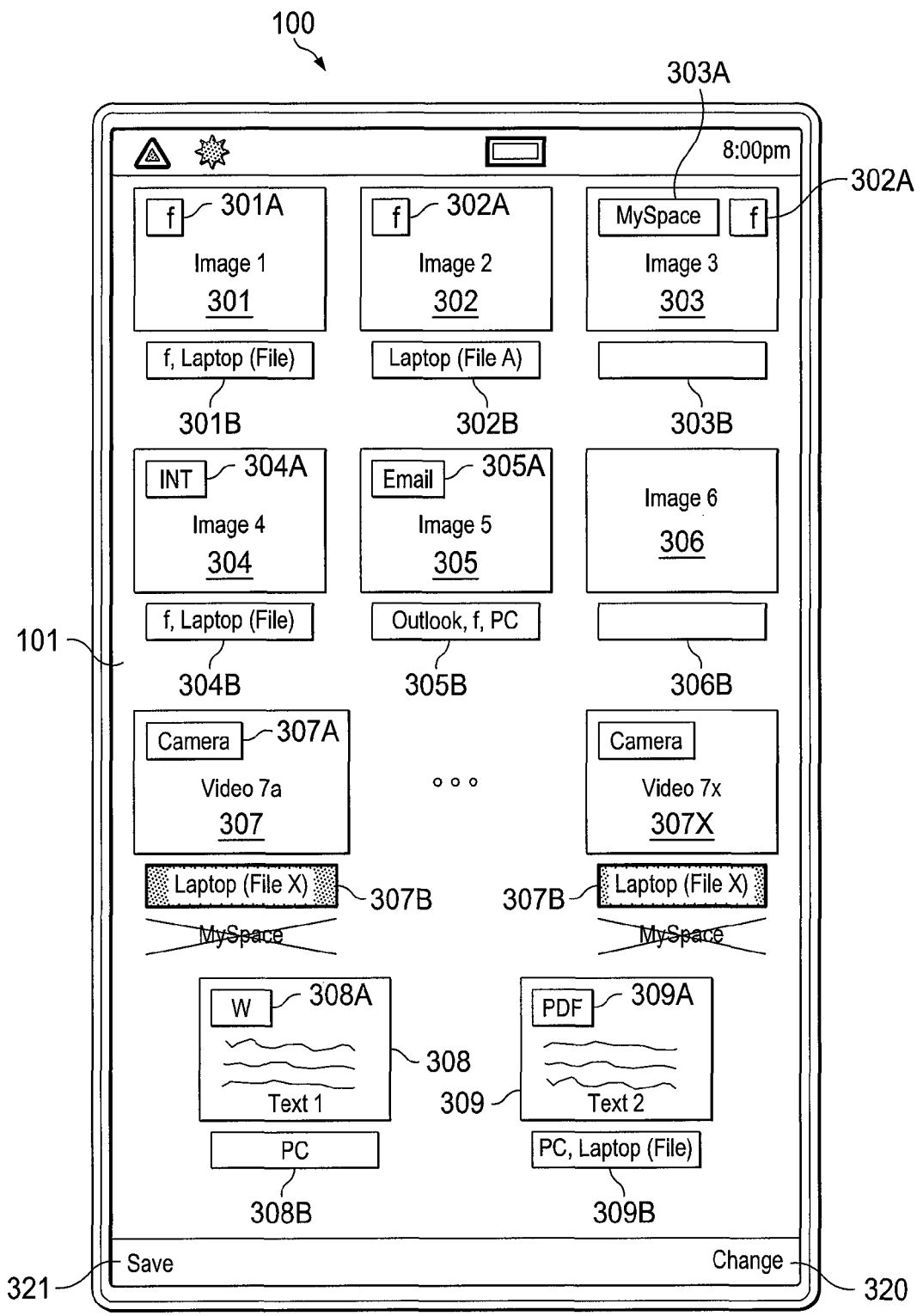

FIGS. 3 and 4 show embodiments (for example embodiment 100) of the user interface (for example user interface 101) for controlling media destinations for media newly available for delivery regardless of the media's source, type, or destination. Thus, as shown in FIG. 3, when a trigger event occurs (as discussed above) the newly available media (or portions thereof) are displayed for the user. These displays are shown as 301-309. In the embodiment shown, each displayed image carries with it an indication 301A-309A pertaining to where the media originated. For example, image 301 came from Facebook (301A) and image 305 came as part of an e-mail (305A). If desired, each media can be identified as to media type, i.e., photo image, video, text, game, word document, etc. The source identifier and image type can be separate tags or the same tag.

Also, if desired, each image can have displayed with it other tags, such as tags, 301B-309B, indicating to the user where the image is scheduled to be delivered if the user takes no further action. For example, image 301 will be delivered to Facebook and to the user's laptop at a particular file (tag 301B) and image 305 will be delivered automatically to Outlook, to Facebook and to the user's laptop (305B). These pre-identified destinations, can be the last-destination the user sent this particular media-type, or the designation can be set up by the user so that the user can maintain control of where a particular image is being stored.

Assuming that the user desired to maintain all of the previously designated locations, the user would enable the transfer of the media by a single operation. This operation can be a voice command or the push of a button, (e.g. 1 click indicating approval), such as the choosing of OK button 321. In some embodiments this single command can be a lack of a command such as doing nothing for a time out period as shown by process 215.

If the user desires to change destination, remote access settings, or processing options, then the user chooses CHANGE button 322 (prior to the time out expiring if a timeout is being used) which then causes a display, such as the display shown in FIG. 4, where the user can selectively change the destination box for any selected media. For example, should the user desire to send video stream 307 to a destination other than MySpace then the user can change the destination, as shown at tab 307B. In this example, video 307 will be stored in the user's laptop in folder X. Also note that image 302 will be stored at location folder B instead of in default folder A. The user, if desired, can be given the option to make this a one time change or a permanent change. After the user has made all the changes the user desires the user enables the SEND button and all of the images are communicated to the desired locations without any further user manipulation required.

Figure 5:
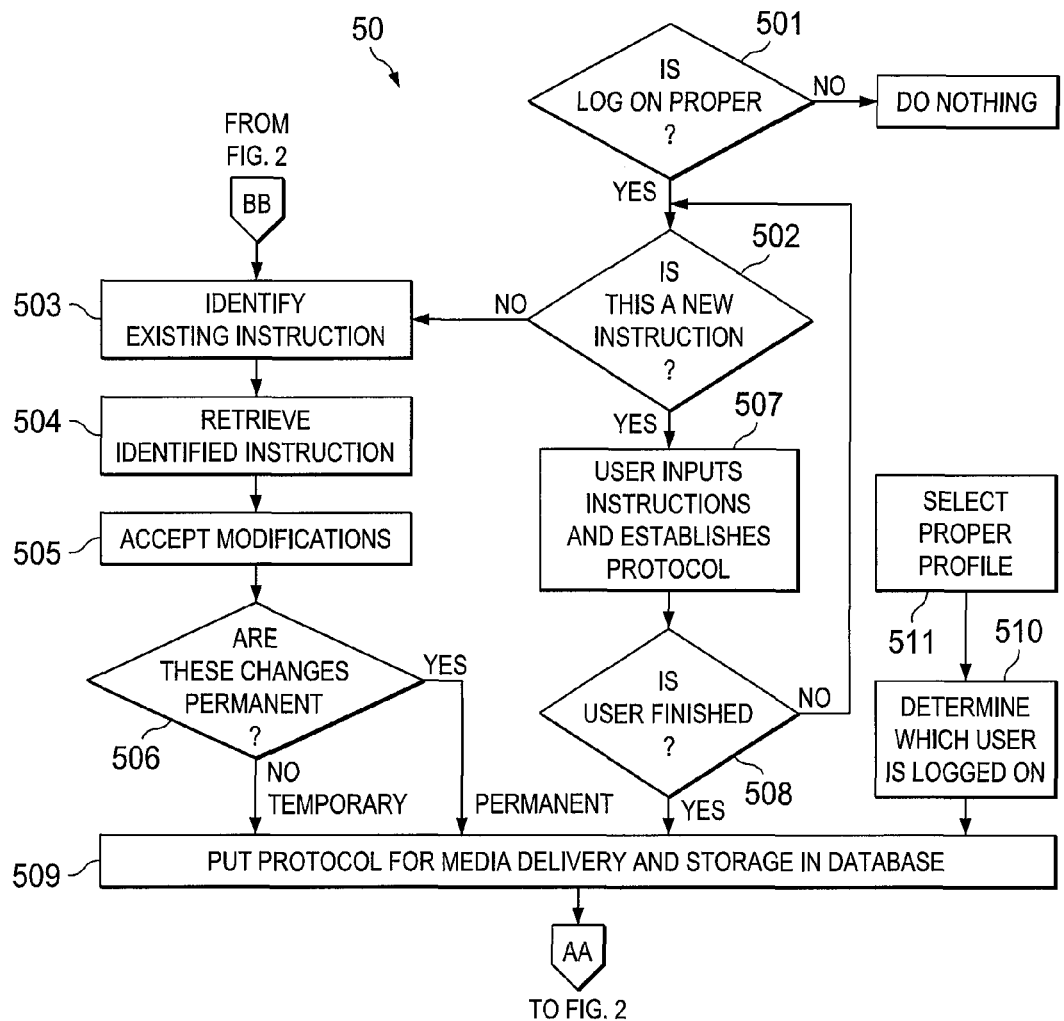
FIG. 5 shows on embodiment of a method for setting up and changing a user's profile of pre-identified default delivery and/or storage locations for available media.

FIG. 5 shows on embodiment of a method, such as method 50, for setting up and changing a user's profile of pre-identified default media processing, remote media access, and media delivery and/or storage locations. Process 501 determines if the user has properly logged onto the system. If so, then process 502 determines if the user is inputting a new instruction. If not, then process 503 identifies the existing instruction that is to be modified and process 504 retrieves that instruction(s). The instruction can be identified by selection from a list, by the user running his/her mouse over the existing instruction. Or the instruction can be global, such that all media from a particular location (camera, Facebook, MySpace, etc.) is to be made accessible by photobucket.com or copied to a particular location on the user's laptop.

Process 505 accepts the change and process 506 determines from interaction with the user (or from previous instructions) whether the change is temporary or permanent. The changes (new protocols) are placed in storage in a database via process 509 to be used when media becomes available on the user's device. Process 508 determines if the user is finished. If not, the user is given an opportunity to add more instructions.

In the situation where the user is inputting a new set of default designations then process 507 accepts the user input and establishes any protocols and credentials required to interact with the remote program or destination. When the user is finished the newly created protocols and/or credentials are stored in the database for use when media is available on the user's device.

Note that while only one device is shown, the protocols can be used across many user devices and can be different for different devices, if desired. In such a situation a particular device might be set up to handle media using different settings depending upon which user is logged on to the device at the time the media becomes available. Under such a system, processes 510 and 511 will control which protocol is used to control the transportation of the media to the proper locations on a per user basis.

Figure 6:
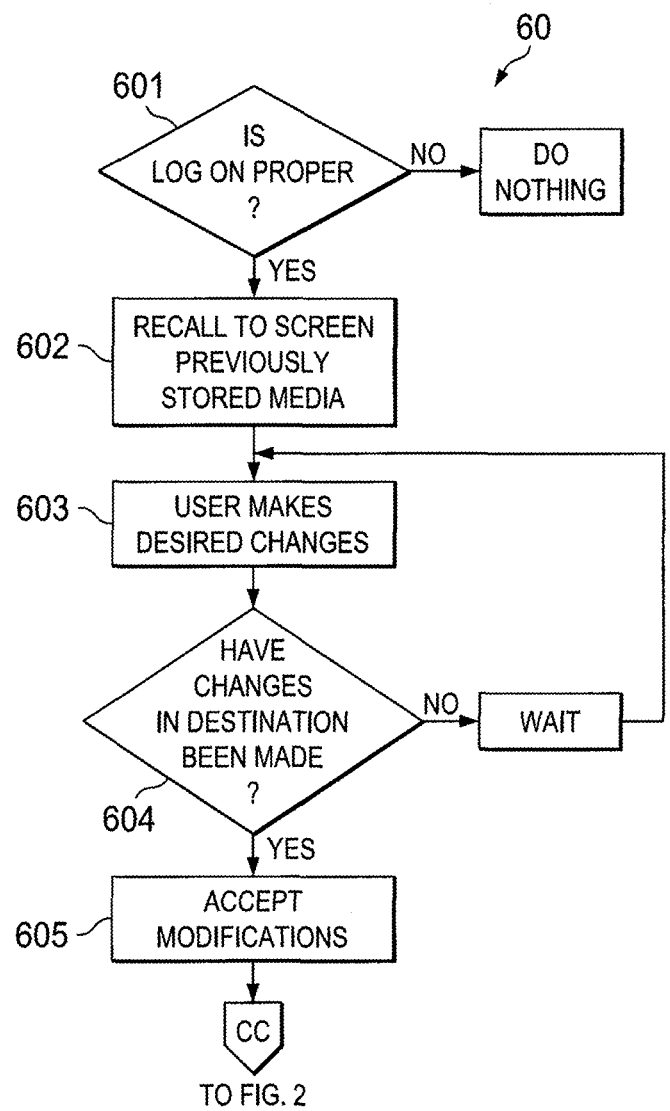
FIG. 6 shows one embodiment of a method for moving or changing previously stored media.

FIG. 6 shows one embodiment of method 60 for allowing a user to move, change, or update remote access permissions for previously stored media using a single operation for any number of media movements. After process 601 confirms a proper log-on by the user then process 602 allows the user to select any previously stored media regardless of where it was stored, either locally or at one or more sites. This election is facilitated by the user bringing up the desired media (or a range of media) and when the desired media is displayed on the user's screen each retrieved media element will have associated therewith a tag, such as tag 301B, showing where the media element was stored. If the user desires to make a change to one or more media element then the user simply enters the tag, for example, by running a pointer over the tag to open the tag for editing. Process 603 then allows the user to make his/her desired changes, which can include additions, subtractions or total elimination. When these changes are concluded, process 604 controls the acceptance of the changes by process 605 which then in turn causes processes 211, 210, 212 (FIG. 2) to perform their respective functions as discussed above so as to cause the various media elements to be changed at their respective previously stored locations. In some situations, the processing could include automatic or user initiated control over red-eye, rotation, resizing or media correction, such as blanking out exposed portions of certain objects to meet certain standards. For example, to prevent a charge of indecent exposure, exposed body parts could be covered or "air brushed" all automatically if desired.

For example, assume that media element 301 was previously stored in an album available to the user's friends on Facebook and after the modification the user has removed Facebook as a destination from tag 301B. Then, after the updated change operation the media element 301 would no longer be available on Facebook because the user's system would take what ever action is required by the Facebook protocol to remove media element 301. Note that the user may not even know how to perform some of the functions of adding or removing a media element or elements from a location since the protocol for controlling that operation is part of the system operation as described above. This then makes it easy for a user to move media elements from location to location by simply adjusting the tags associated with each media element and the system performs the proper communication functions without user involvement.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. By way of example, many embodiments have been presented herein focused around the experience of a home PC user. But some or all of the logic, preferences, and media items described herein could instead be stored on a remote server so long as some minimal amount of new media detection and media access on the device(s) to which this new media is presented. Accordingly, the appended claims are intended to include within their scope such processes, machines, manufacture, compositions of matter, means, methods, or steps.

What is claimed is:

1. A method of managing a plurality of media files by a computer device, said method comprising:

receiving, by said computer device, said plurality of media files from a plurality of sources, said computer device programmed for automatically distributing said plurality of media files to a plurality of pre-established locations;

automatically displaying to a user, on a display of said computer device, (A) an image of each of said plurality of media files, (B) an indicator that identifies a first default destination of a first media file of said plurality of media files, and (C) an indicator that identifies a second default destination of a second media file of said plurality of media files, wherein said first default destination and said second default destination are different and are remote from said computer device, wherein said first default destination and said second default destination comprise at least one third party social networking website;

providing the user with an opportunity to intervene prior to said distributing;

when an intervening signal is not received from the user within a pre-established period of time, automatically formatting said first media file to a first pre-established delivery protocol for said first default destination and automatically formatting said second media file to a second pre-established delivery protocol for said second default destination, wherein said first pre-established delivery protocol and said second pre-established delivery protocol each includes a communication link protocol, a credential for authentication, and a storage protocol, wherein said distributing comprises sending said first media file to said first default destination and sending said second media file to said second default destination, without any action by said user; and when an intervening signal is received from the user, (a) receiving one or more directives to modify one or more existing instructions regarding at least said first default destination or said second default destination, (b) for each destination for which said one or more directives have been received, modifying said one or more existing instructions, (c) formatting respective ones of said first media file and said second media file that relate to said modified one or more existing instructions, and (d) sending said first media file and said second media file, wherein at least one of said first media file and said second media file is sent according to said modified one or more existing instruction.

2. The method of claim 1 wherein said plurality of media files comprises photographs and videos.

3. The method of claim 1 wherein the image in said automatically displaying to a user an image of each of said plurality of media files is a thumbnail image of said each of said plurality of media files.

4. The method of claim 1 further comprising pre-establishing where a particular one of said plurality of media files should be distributed based on a location where said particular one of said plurality of media files was created.

5. The method of claim 1 further comprising:
maintaining access permission for said third party social networking website on said computer device.

6. The method of claim 1 wherein formatting said first media file or said second media file comprises: red-eye correction, brightness adjustment, contrast adjustment, rotation, resizing, addition of metadata, and image correction.

7. The method of claim 1 further comprising: displaying information pertaining to one or more of said plurality of media files, wherein said information pertaining to said one or more of said plurality of media files is derived from either (a) an analysis, of said one or more of said plurality of media files, that comprises using at least a picture recognition algorithm or (b) metadata associated with said one or more of said plurality of media files.

8. The method of claim 1 further comprising: allowing a user to batch process said plurality of media files a plurality of said plurality of pre-established locations concurrently even when each said of said plurality of pre-established locations requires different protocols with respect to format, content or communication capability.

9. A non-transitory medium for storing code for controlling a processor, said code operable, when running on said processor in a computer device for controlling said computer device, to perform the following method with respect to said computer device:

receiving, by said computer device, a plurality of media files from a plurality of sources, said computer device programmed for automatically distributing said plurality of media files to a plurality of pre-established locations;

automatically displaying to a user, on a display of said computer device, (A) an image of each of said plurality of media files, (B) an indicator that identifies a first default destination of a first media file of said plurality of media files, and (C) an indicator that identifies a second default destination of a second media file of said plurality of media files, wherein said first default destination and said second default destination are different and are remote from said computer device, wherein said first default destination and said second default destination comprise at least one third party social networking website;

providing the user with an opportunity to intervene prior to said distributing;

when an intervening signal is not received from the user within a pre-established period of time, automatically formatting said first media file to a first pre-established delivery protocol for said first default destination and automatically formatting said second media file to a second pre-established delivery protocol for said second default destination, wherein said first pre-established delivery protocol and said second pre-established delivery protocol each includes a communication link protocol, a credential for authentication, and a storage protocol, wherein said distributing comprises sending said first media file to said first default destination and sending said second media file to said second default destination, without any action by said user; and when an intervening signal is received from the user, (a) receiving one or more directives to modify one or more existing instructions regarding at least said first default destination or said second default destination, (b) for each destination for which said one or more directives have been received, modifying said one or more existing instructions, (c) formatting respective ones of said first media file and said second media file that relate to said modified one or more existing instructions, and (d) sending said first media file and said second media file, wherein at least one of said first media file and said second media file is sent according to said modified one or more existing instruction.

10. The non-transitory medium of claim 9 wherein said plurality of media files comprises photographs and videos.

11. The non-transitory medium of claim 9 wherein
the image in said automatically displaying to a user an image of each of said plurality of media files is a thumbnail image of said each of said plurality of media files.

12. The non-transitory medium of claim 9 wherein said code further operable for controlling said computer device to:
pre-establish where a particular one of said plurality of media files should be distributed based on a location where said particular one of said plurality of media files was created.

13. The non-transitory medium of claim 9 wherein said code further operable for controlling said computer device to:
maintain access permission for said third party social networking website on said computer device.

14. The non-transitory medium of claim 9 wherein said code further operable for controlling said computer device to:
format said first media file or said second media file comprises: red-eye correction, brightness adjustment, contrast adjustment, rotation, resizing, addition of metadata, and image correction.

15. The non-transitory medium of claim 9 wherein said code further operable for controlling said computer device to:
display information pertaining to one or more of said plurality of media files, said information pertaining to said one or more of said plurality of media files derived from (a) an analysis, of said one or more of said plurality of media files, that comprises using at least a picture recognition algorithm or (b) metadata associated with said one or more of said plurality of media files.

16. The non-transitory medium of claim 9 wherein said code further operable for controlling said computer device to:
   allow a user to batch process said plurality of media files a plurality of said plurality of pre-established locations concurrently even when each said of said plurality of pre-established locations requires different protocols with respect to format, content or communication capability.

* * * * *